UNITED STATES PATENT OFFICE.

JAMES LOUCKS, OF INDIANAPOLIS, INDIANA.

IMPROVED HAIR-RESTORATIVE.

Specification forming part of Letters Patent No. 41,076, dated January 5, 1864.

*To all whom it may concern:*

Be it known that I, JAMES LOUCKS, of Indianapolis, in the county of Marion and State of Indiana, have invented a new and useful compound for Restoring and Beautifying the Hair; and I do hereby declare that the following is a full and exact description thereof.

The nature of my invention consists in making a compound of several common and well-known substances that will, by virtue of its action upon the skin, cause the hair to grow upon such portions of the head as it may have, from an unhealthy condition of the skin, fallen off and become prematurely bald.

To enable others skilled in the art to make and use my invention, I will proceed to describe its composition and application.

I compound my hair-restorative of the following substances, viz: olive or sweet oil, tincture of *Lobelia inflata, Cypripedium pubescens,* and *Agrimonia eupatoria.* The tinctures of *Lobelia inflata, Cypripedium pubescens,* and *Agrimonia eupatoria* I make by digesting the ground seed in alcohol in the proportion of one pound of the seeds of each separately digested in one and one-half gallon of ninety-five per cent. alcohol for any length of time sufficient to extract the strength of the seed—say from two to four weeks. Of these tinctures or extracts I use in compounding my hair-restorative two and one-half ounces lobelia, ten drops cypripedium, ten drops agrimonia, and two ounces of sweet or olive oil.

Although I do not desire to confine myself to the exact quantity of each substance named in the composition of my hair-restorative, I deem the proportions here given as usually the best for the purpose.

In using the compound on bald heads for restoring the hair it should be applied daily at night by rubbing it upon the skin of the head with a soft brush or with the fingers. For promoting a vigorous growth and beautifying the hair it will be sufficient to apply it twice a week in the same manner.

What I claim as my invention or discovery, and desire to secure by Letters Patent, is—

The compound herein-described, when composed of the substances as specified, with the variations contemplated, and used for the purposes set forth.

JAMES LOUCKS.

Witnesses:
J. R. BRUCHEN,
ED. DAVIS.